United States Patent
Bates et al.

(10) Patent No.: US 9,632,908 B1
(45) Date of Patent: Apr. 25, 2017

(54) RUN TO END OF AN EXECUTION PATTERN IN A SOFTWARE DEBUGGER

(71) Applicant: International Business Machines Corporation, Armonk, NY (US)

(72) Inventors: Cary L. Bates, Rochester, MN (US); Brian R. Muras, Otsego, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/986,967

(22) Filed: Jan. 4, 2016

(51) Int. Cl.
*G06F 3/00* (2006.01)
*G06F 9/44* (2006.01)
*G06F 11/36* (2006.01)

(52) U.S. Cl.
CPC .......... *G06F 11/3624* (2013.01); *G06F 8/70* (2013.01)

(58) Field of Classification Search
CPC .................. G06F 11/3664; G06F 2201/86
USPC .................................. 719/318; 717/124–134
See application file for complete search history.

(56) References Cited

U.S. PATENT DOCUMENTS

| | | | |
|---|---|---|---|
| 7,735,069 B2 | 6/2010 | Bustelo et al. | |
| 8,572,579 B2 | 10/2013 | Ashish et al. | |
| 8,756,572 B2 | 6/2014 | Halliday et al. | |
| 8,782,611 B1 | 7/2014 | Kretzler et al. | |
| 9,152,536 B1* | 10/2015 | Fors | G06F 11/3624 |
| 2004/0103398 A1* | 5/2004 | Agarwala | G06F 11/3636 717/128 |
| 2012/0011439 A1* | 1/2012 | Karn | G06F 11/3414 715/704 |
| 2013/0318504 A1 | 11/2013 | Eker et al. | |
| 2014/0115566 A1* | 4/2014 | Cao | G06F 9/444 717/129 |

* cited by examiner

*Primary Examiner* — Camquy Truong
(74) *Attorney, Agent, or Firm* — Shumaker & Sieffert, P.A.

(57) ABSTRACT

Techniques are described for a run to end of execution pattern in a software debugger. In one example, a method includes identifying a pattern of stop events in a program. The method further includes executing the program in a debugger, wherein executing the program includes encountering a stop event, determining if the stop event is part of the pattern of stop events, and ignoring the stop event in response to determining that the stop event is part of the pattern of stop events.

9 Claims, 9 Drawing Sheets

RUN TO END OF AN EXECUTION PATTERN IN A SOFTWARE DEBUGGER

TECHNICAL FIELD

This disclosure relates to debuggers.

BACKGROUND

Programs written in compiled programming languages typically require debugging. A debugger is a computer software program used to test and debug programs. A user generally steps through the program from stopping point to stopping point (e.g., breakpoints) and stops the execution of a program at each of these stop events.

SUMMARY

In one aspect of the invention, a method includes identifying a pattern of stop events in a program. The method further includes executing the program in a debugger and with one or more processing devices, wherein executing the program includes encountering a stop event; determining if the stop event is part of the pattern of stop events; and ignoring the stop event in response to determining that the stop event is part of the pattern of stop events.

In another aspect, a computer system includes one or more processors and one or more computer-readable memories. The computer system also includes program instructions, stored on at least one of the one or more storage devices for execution by at least one of the one or more processors via at least one of the one or more memories, to identify a pattern of stop events in a program. The computer system also includes instructions to encounter a stop event. The computer system also includes instructions to determine if the stop event is part of the pattern of stop events. The computer system also includes instructions to ignore the stop event in response to determining that the stop event is part of the pattern of stop events.

In another aspect, a computer program product includes a computer-readable storage medium having program code embodied therewith, the program code executable by a processor to identify a pattern of stop events in a program. The computer program product further includes program code to encounter a stop event. The computer program product also includes program code to determine if the stop event is part of the pattern of stop events. The computer program product also includes program code to ignore the stop event in response to determining that the stop event is part of the pattern of stop events.

The details of one or more embodiments of the disclosure are set forth in the accompanying drawings and the description below. Other features, objects, and advantages of the disclosure will be apparent from the description and drawings, and from the claims.

DETAILED DESCRIPTION

A debugger is a computer software program used to test and debug programs. The debugging process can be time-consuming, especially when the program has long-running loops such that it can be difficult to move quickly through the program to arrive at a desired stopping point. Often, when debugging a program, where the user is stepping through the program code from stopping point to stopping point (e.g., breakpoints), the user may notice patterns in the program. For example, this might occur when the program code is in long-running loops. In many of these situations, the user knows that the desired stopping point in an execution of a program occurs after the pattern completes, but the user is unable to establish or reestablish breakpoints to avoid the pattern, keeping the program in execution, and getting the program closer to a desired stopping point without interruption.

Allowing the program to run to the completion of a pattern may provide a powerful feature for a debugger and may greatly enhance a user's productivity. Techniques of this disclosure may enable debugging of such code while keeping track of and avoiding known breakpoints within patterns such as long-running loops, thus speeding up the executing of the program to a desired stopping point or to identifying unknown breakpoints. Systems and methods for a run to end of an execution pattern in a debugger are described below.

Figure 1:
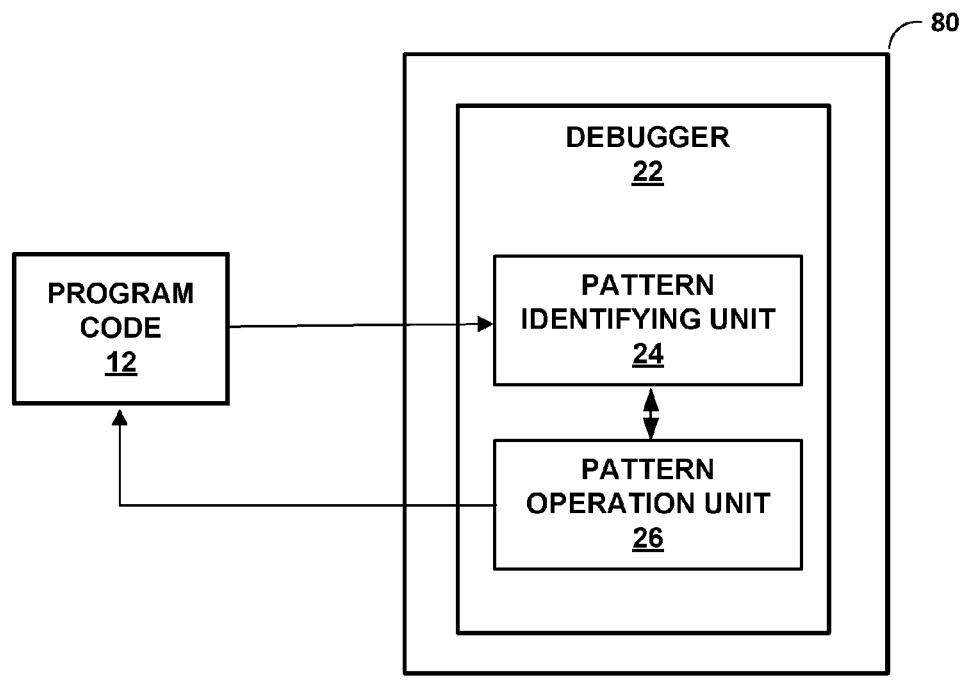
FIG. 1 depicts a block diagram of a debugger that may perform, with one or more processors, a run to end of an execution pattern of a program code, in one aspect of the disclosure.

FIG. 1 depicts a block diagram of a debugger 22 that may perform, with one or more processors, a run to end of an execution pattern of a program code 12, in one aspect of the disclosure. FIG. 1 illustrates an example context in which debugger 22 may execute a program code 12 on a computing device 80 for debugging the program code 12 and may further perform a run to end of an execution pattern of the program code 12. A pattern identifying unit 24 of debugger 22 may identify a pattern of stop events through the determination of current stop events and previous occurrences of the current stop event. Debugger 22 may determine if next occurrences of stop events are part of the pattern of stop events. A pattern operation unit 26 of debugger 22 may ignore the next occurrence of the stop event if the stop event is part of the identified pattern of stop events and may stop the execution of program code 12 if the next occurrence of the stop event is not a part of the identified pattern of stop events.

Figure 2:
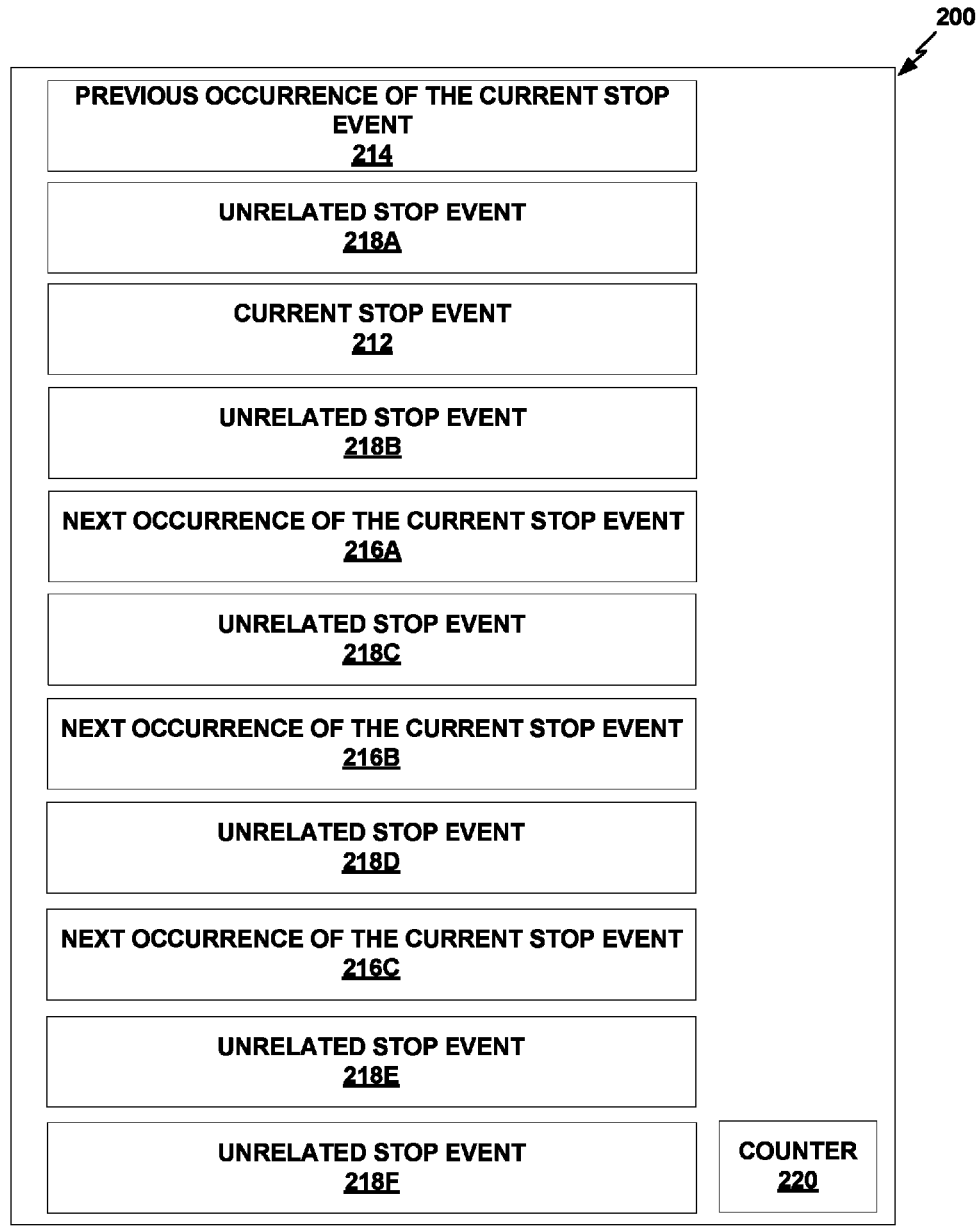
FIG. 2 depicts a block diagram of an ordered list of stop events, in one aspect of this disclosure.

FIG. 2 depicts a block diagram of an ordered list of stop events 200, in one aspect of this disclosure. Debugger 22 may stop execution of program code 12 in response to hitting a stop event. Stop events may include a step completed, a breakpoint hit, a location, or a file and line number. In the present disclosure, debugger 22 may generate an ordered list 200 of stop events. For example, FIG. 2 depicts one example of an ordered list 200 of nine stop events including a current stop event 212, a previous occurrence 214 of the current stop event, one or more unrelated stop events 218A-218F (collectively "unrelated stop events 218"), and one or more next occurrences 216-216C (collectively "next occurrences 216") of the current stop event. Debugger 22 may stop at a breakpoint at line fifty of program code 12, which may be the current stop event 212 in the ordered list 200 of stop events. The ordered list 200 of debugger 22 may also list a previous occurrence 214 of the current stop event 212. For example, previous occurrence 214 may have occurred at another breakpoint related to the breakpoint found at line fifty of program code 12 (the current stop event 212), and is located in ordered list 200 before the current stop event 212. In another example, the previous occurrence 214 may be the nearest past occurrence to the current stop event 212 among multiple past occurrences 214. The ordered list 200 may further list one or more next occurrences 216 related to the current stop event 212, and located after the current stop event 212 in the ordered list 200. For example, one of the next occurrences 216 may occur at another, subsequent breakpoint related to the breakpoint found at line fifty of the program code 12 (the current stop event 212), which may be located after the current stop event 12. The ordered list 200 may also list a counter 220 to enter a sequence of one or more stop events associated with program code 12. The ordered list 200 in this disclosure is not limited to the illustrative order depicted in FIG. 2 and may include variations of current stop events 212, one or more previous occurrences 214, one or more next occurrences 216, and one or more unrelated stop events 218.

Figure 3:
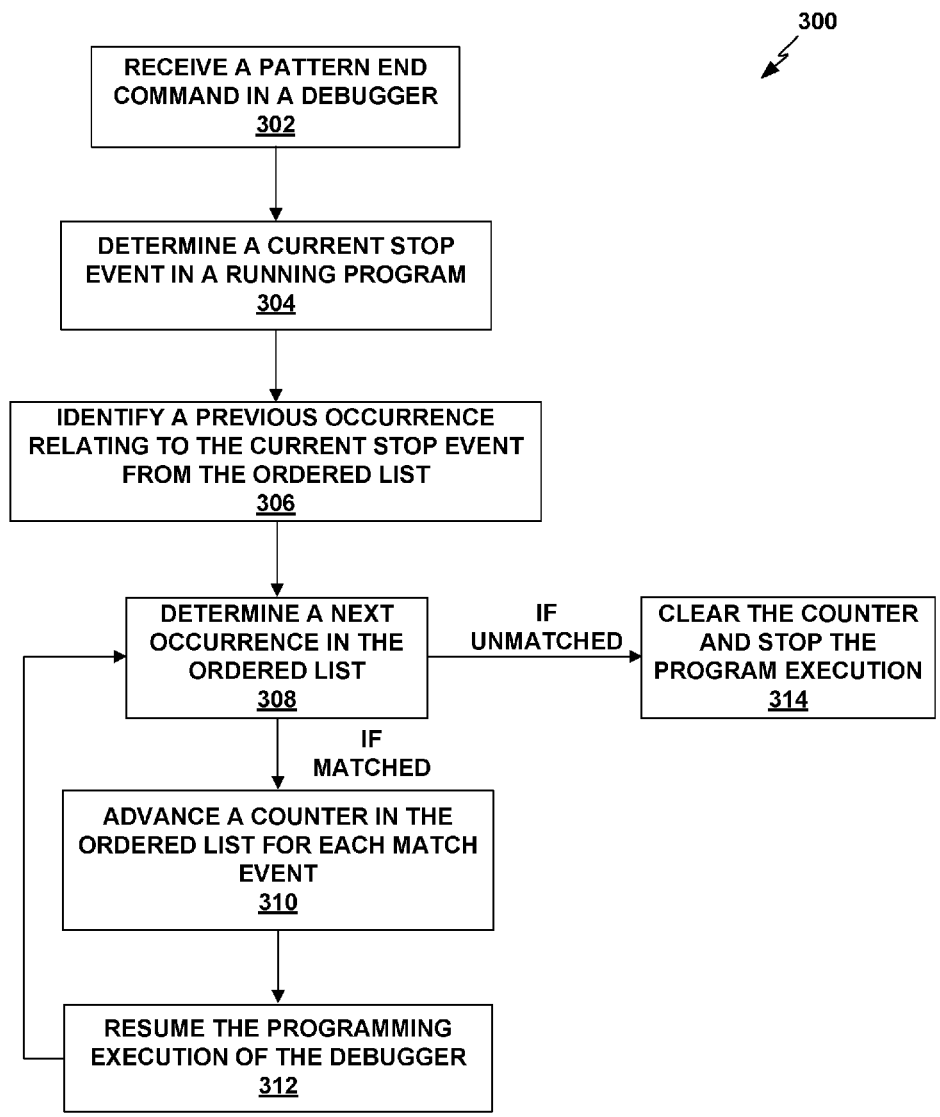
FIG. 3 depicts a flowchart of an example debugging method, in one aspect of this disclosure.

FIG. 3 depicts a flowchart of an example debugging method 300, in one aspect of this disclosure. More specifically, FIG. 3 illustrates an example context in which a method of a run to end of an execution pattern in debugger 22 as in FIG. 1 may resume an execution of program code 12 of debugger 22 in response to identifying a pattern. For example, debugger 22 may receive a pattern end command (302), which may be an execution command informing debugger 22 to run a debugging process without stopping debugger 22 during execution of program code having a particular pattern of stop events. After debugger 22 receives the pattern end command, debugger 22 may identify a current stop event 212 in a running program code 12 (304), which may be a latest entry in an ordered list 200 of stop events. Debugger 22 may track the stop events as they come in along with the corresponding line numbers in program code 12. In the present disclosure, one or more stop events may be listed in an ordered list 200 of stop events detailing the order in which the stop events occur, such as is shown in FIG. 2.

After debugger 22 identifies the current stop event 212 in a running program code 12, debugger 22 identifies a previous occurrence 214 related to the current stop event 212 from the ordered list 200 (306). For example, if debugger 22 stopped at line fifty in a program code 12 due to a breakpoint being hit, debugger 22 may start looking backwards, or other direction representing a previous instance, on the list 200 for the previous occurrence 214 of a breakpoint being hit. Debugger 22 identifies a pattern of stop events if the current stop event 212 and previous occurrence 214 match.

Debugger 22 determines one or more next occurrences 216 in the ordered list 200 (308). For example, in the previous example, if another previous occurrence of a breakpoint is hit at line fifty of program code 12, debugger 22 may look for one or more next occurrences 216 of a breakpoint at the next occurrence of line fifty of program code 12.

In response to finding one or more next occurrences 216, debugger 22 may begin determining if the one or more next occurrences 216 in the ordered list 200 are part of the pattern. The pattern is further developed by entering a sequence of one or more stop events associated with program code 12. For example, counter 220 may be advanced in the ordered list 200 for each match event (310). More specifically, debugger 22 may compare one or more next occurrences 216 to the current stop event 212. When the one or more next occurrences 216 match the current stop event 212, the counter 220 in the ordered list 200 is advanced to indicate the current stop event 212 is part of the pattern. Along with the advancement of the counter 212 in the ordered list 200, the programming execution of debugger 22 ignores the current stop event 216 and continues execution of program code 12 (312). Thus, with each match, the stop event may be ignored, a sequence of the one or more stop events is entered, and debugger 22 may resume execution of program code 12. Debugger 22 may repeat the process to determine a next occurrence in the ordered list 200 (308), advance counter 220 in the ordered list 200 for each match event (310), and resume the execution of program code 12 executed by debugger 22 (312) with each match event, for example.

If there is no match between the next occurrence 216 and the current stop event 212, the pattern is broken. For example, if the next occurrence 216 does not match the current stop event 212, debugger 22 may end the sequence (e.g., clearing the counter 220 in the ordered list 220) and may stop the program execution from resuming (314).

Figure 4:
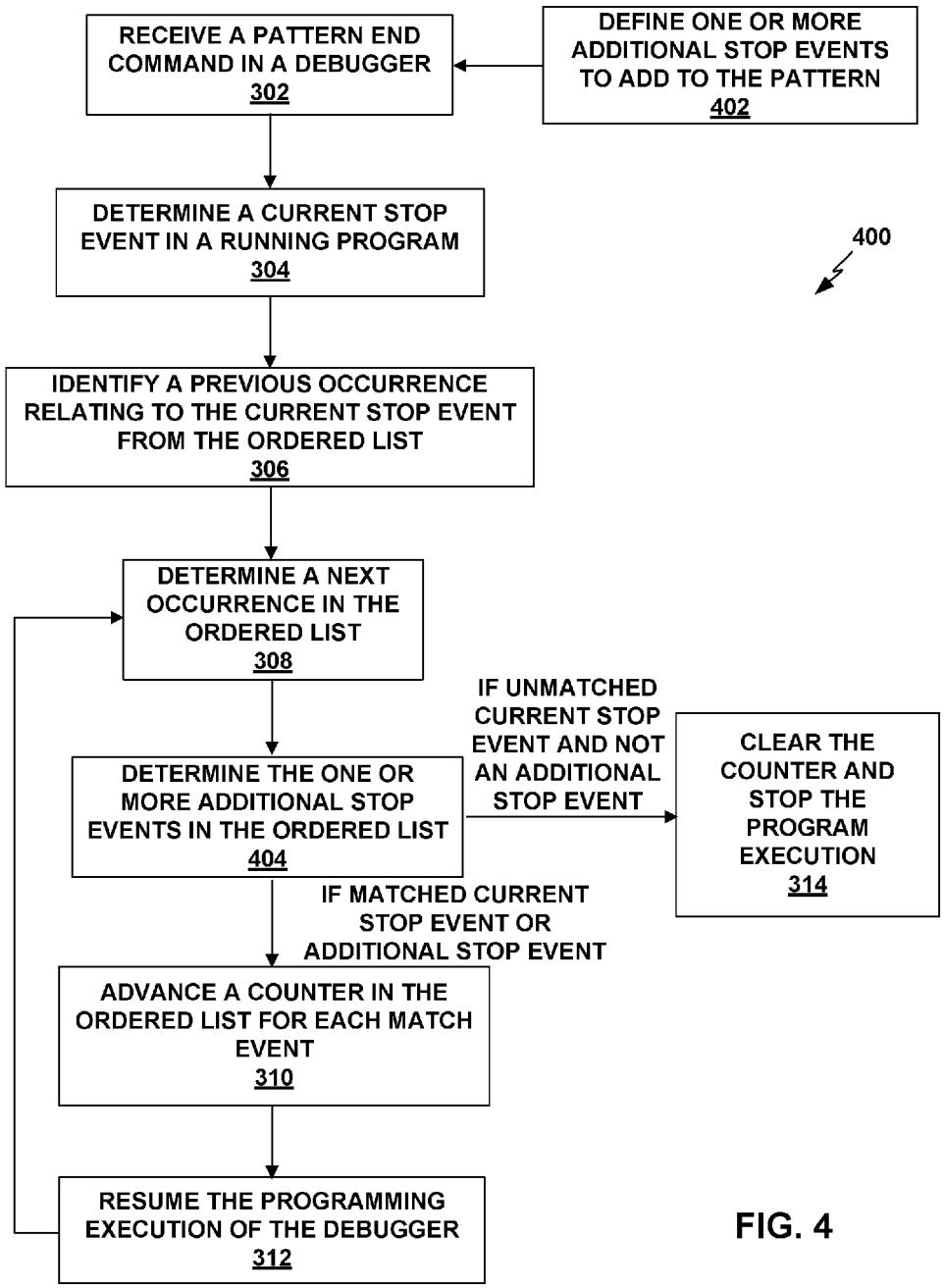
FIG. 4 depicts a flowchart of another example debugging method, in one aspect of this disclosure.

FIG. 4 depicts a flowchart of another example debugging method 400, in one aspect of this disclosure. Debugging method 400 of FIG. 4 is analogous to debugging method 300 of FIG. 3, except as described below. More specifically, debugging method 400 of FIG. 4 also illustrates an example context in which debugger 22 developing a pattern further includes debugger 22 defining one or more conditional statements, such as one or more additional stop events, to add to the pattern (402), and determining the existence of an additional stop event based on the defined additional stop event (404). For example, additional stop events would allow the user to add conditional logic so that a stop event at line five or seven of a program code such as program code 12 may also continue the pattern and not stop the program execution.

Figure 5:
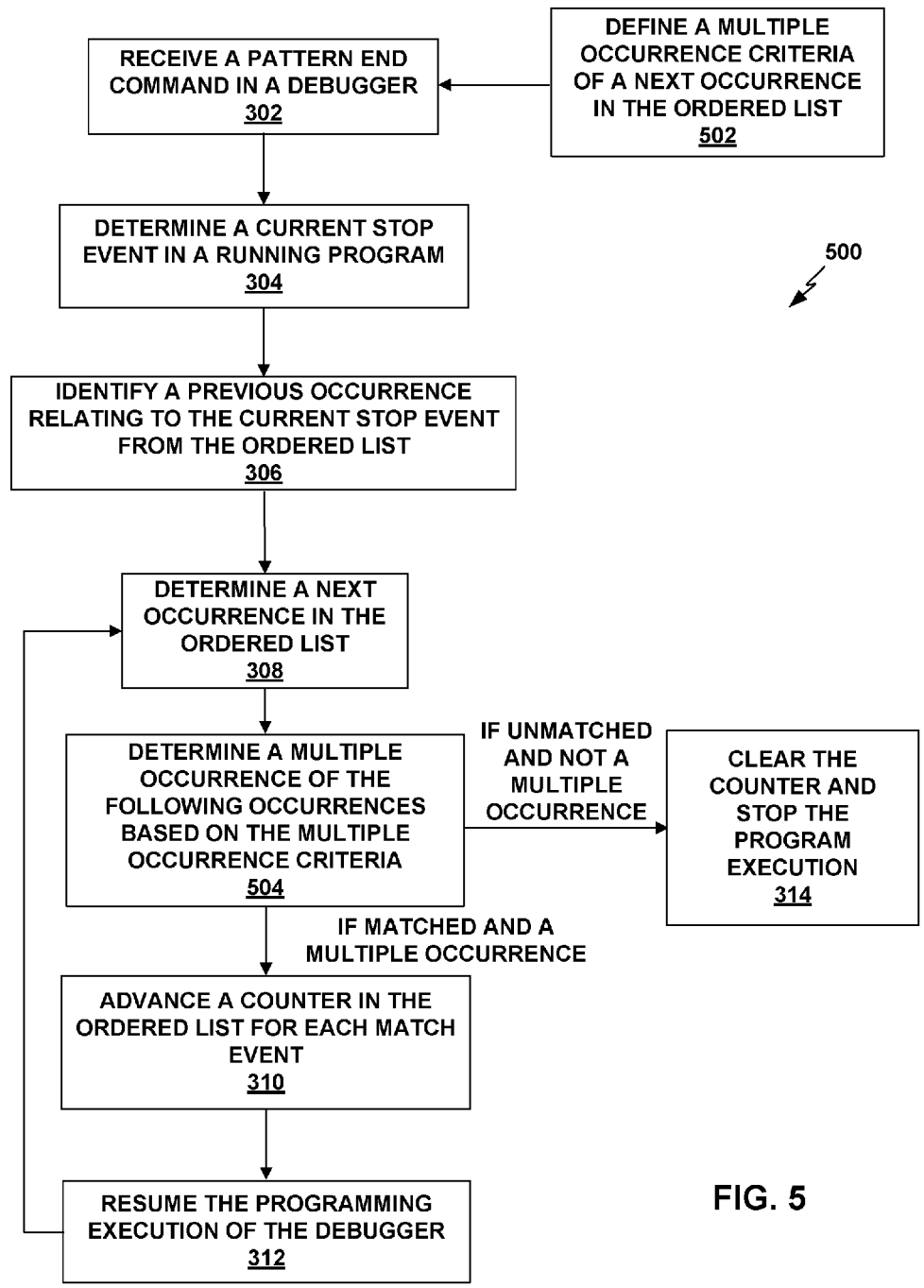
FIG. 5 depicts a flowchart of another example debugging method, in one aspect of this disclosure.

FIG. 5 depicts a flowchart of another example debugging method 500, in one aspect of this disclosure. Debugging method 500 of FIG. 5 is analogous to debugging method 300 of FIG. 3, except as described below. More specifically, debugging method 500 of FIG. 5 also illustrates an example context in which debugger 22 determining a next occurrence 216 in the ordered list 200 further includes debugger 22 defining one or more conditional statements, such as a multiple occurrence criteria (502), and determining if the next occurrence 216 occurs in a multiple occurrence defined by the multiple occurrence criteria (504). For example, debugger 22 may respond to receiving a pattern end command such as "Patternend 3" by looking for at least three of the last three next occurrences 216 of the current stop event 212. A multiple occurrence criteria may require debugger 22 to match three different execution patterns. For example, defining a multiple occurrence would allow the program to continue execution and would only stop if an incoming stop event does not match any of the three patterns.

Figure 6:
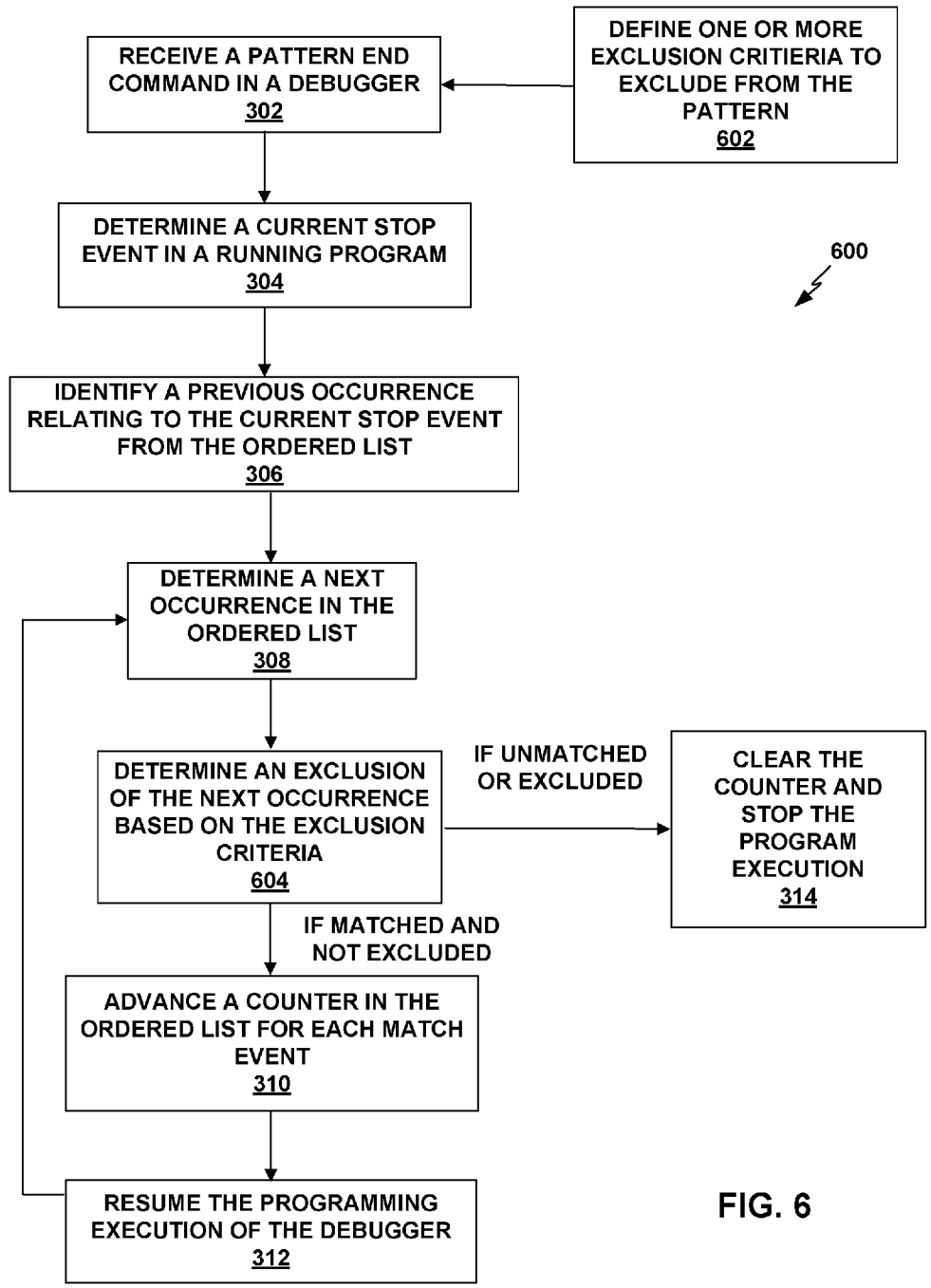
FIG. 6 depicts a flowchart of another example debugging method, in one aspect of this disclosure.

FIG. 6 shows a flowchart of another example debugging method, in one aspect of this disclosure. Debugging method 600 of FIG. 6 is analogous to debugging method 300 of FIG.

3, except as described below. More specifically, debugging method 600 of FIG. 6 also illustrates an example context in which debugger 22 developing a pattern further includes debugger 22 defining one or more conditional statements, such as one or more exclusion criteria, to exclude from the pattern (602), and determining whether an exclusion exists for the next occurrence 216 based on the defined exclusion criteria (604). For example, a pattern end command in debugger 22 may include the command, "patternend*exclude foo.c:24" that would cause debugger 22 to exclude from the pattern any event located at foo.c:24 such that this event may not be checked by the debugger 22.

Figure 7:
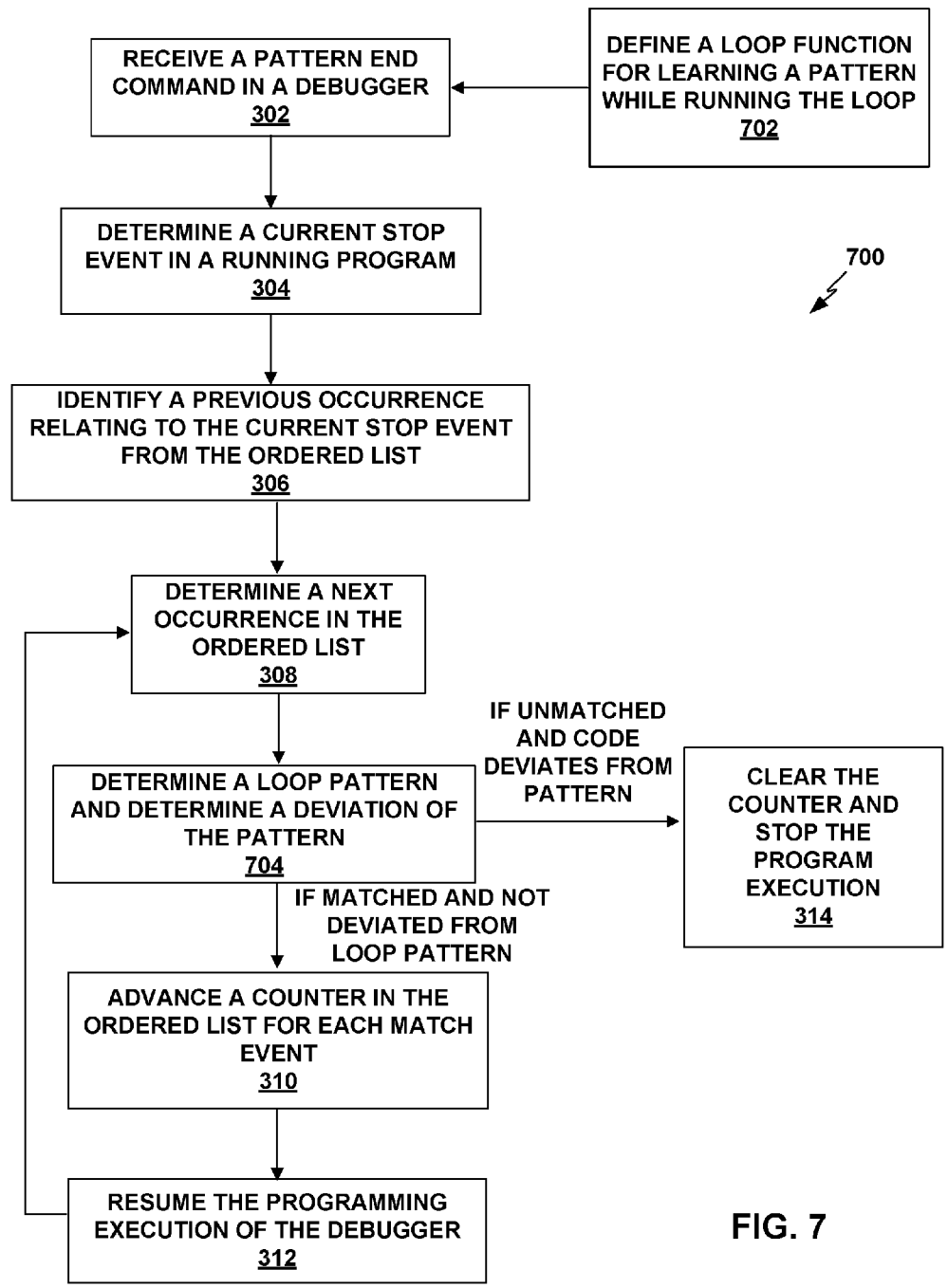
FIG. 7 depicts a flowchart of another example debugging method, in one aspect of this disclosure.

FIG. 7 shows a flowchart of another example debugging method, in one aspect of this disclosure. Debugging method 700 of FIG. 7 is analogous to debugging method 300 of FIG. 3, except as described below. More specifically, debugging method 700 of FIG. 7 also illustrates an example context in which debugger 22 developing a pattern further includes debugger 22 defining one or more conditional statements, such as a loop function, for learning a pattern while running the loop, and stopping the program execution when the code strays from the pattern (702), and determining a loop pattern and determining a deviation from the loop pattern (704). For example, the loop function may be invoked by a user before a loop within the program, which would learn the pattern in the following loop iteration, and break when deviating from the pattern. Thus, debugger 22 would run the loop several times, learn the pattern of which program line numbers are common, and then only stop when the code strays from the learned pattern.

Figure 8:
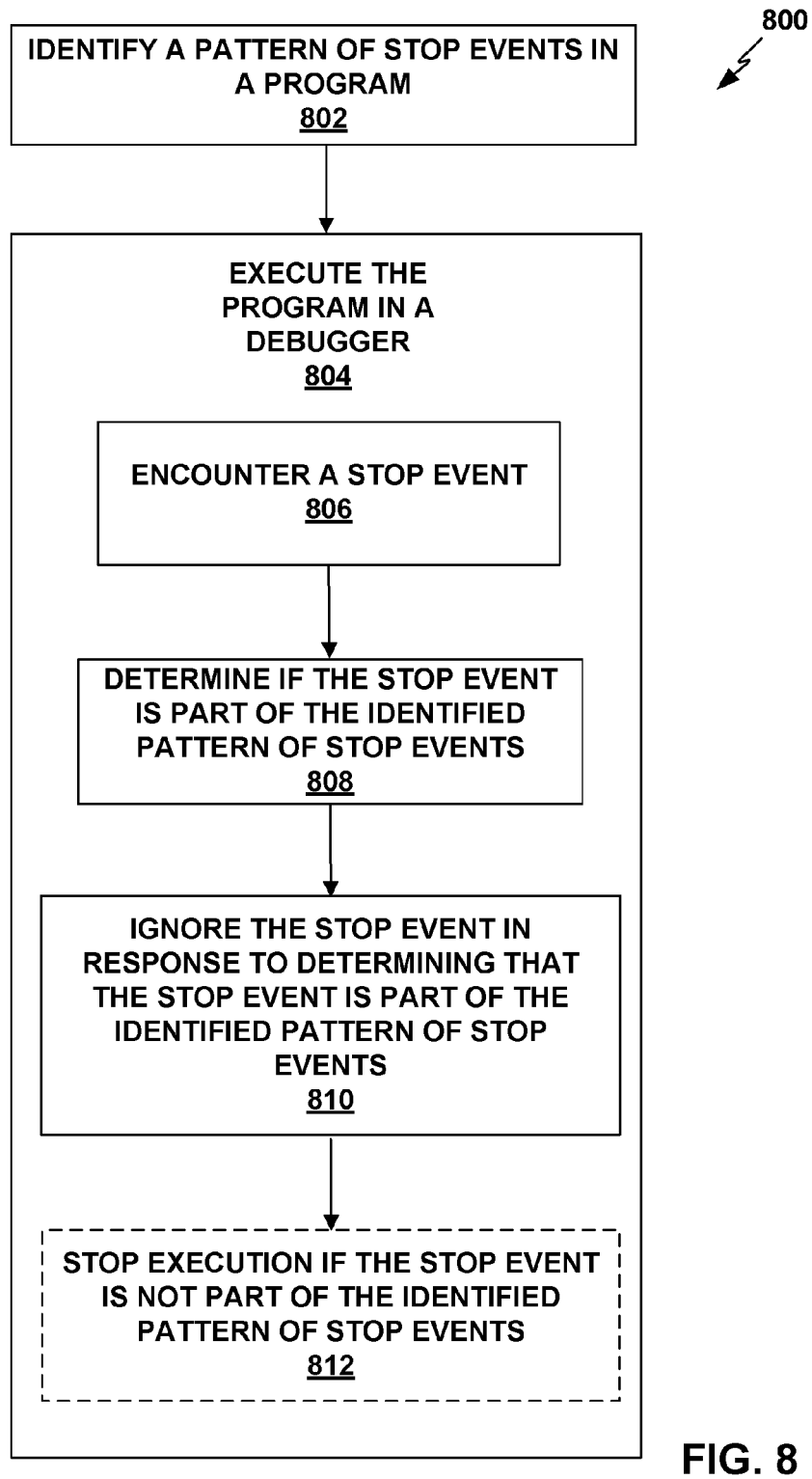
FIG. 8 shows a flowchart of an example debugging method, in one aspect of this disclosure.

FIG. 8 shows a flowchart of an example debugging method, in one aspect of this disclosure. Debugger 22 may execute program code 12 on a computing device 80. When debugger 22 debugs program code 12, debugger 22 may identify a pattern of stop events in the program code 12 (802) as detailed below. For example, the identification of the pattern of stop events from the pattern identifying unit 24 may include the determination of current stop events 212, previous occurrences 214 of a current stop event, and next occurrences 216 of the current stop event. In response to a pattern being identified, debugger 22 may additionally execute program code 12 (804) to determine whether the next stop events are part of the pattern (e.g., debugger 22 performing block 308 and one of blocks 404, 504, 604, or 704 as in FIGS. 3-7). For example, debugger 22 may execute program code 12 and may encounter a stop event (806). Debugger 22 may also determine from program code 12 if the encountered stop event is part of the identified pattern of the stop events (808).

Debugger 22 may further ignore the stop event in response to determining that the stop event is part of the identified pattern of stop events (810) (e.g., pattern operation unit 26 of debugger 22 performing ignoring 310 and 312 as in FIGS. 3-7). In some examples, debugger 22 may optionally further stop the execution of program code 12 if the stop event is not part of the identified pattern of stop events (812) (e.g., pattern operation unit 26 of debugger 22 performing stopping 314 in FIGS. 3-7).

Figure 9:
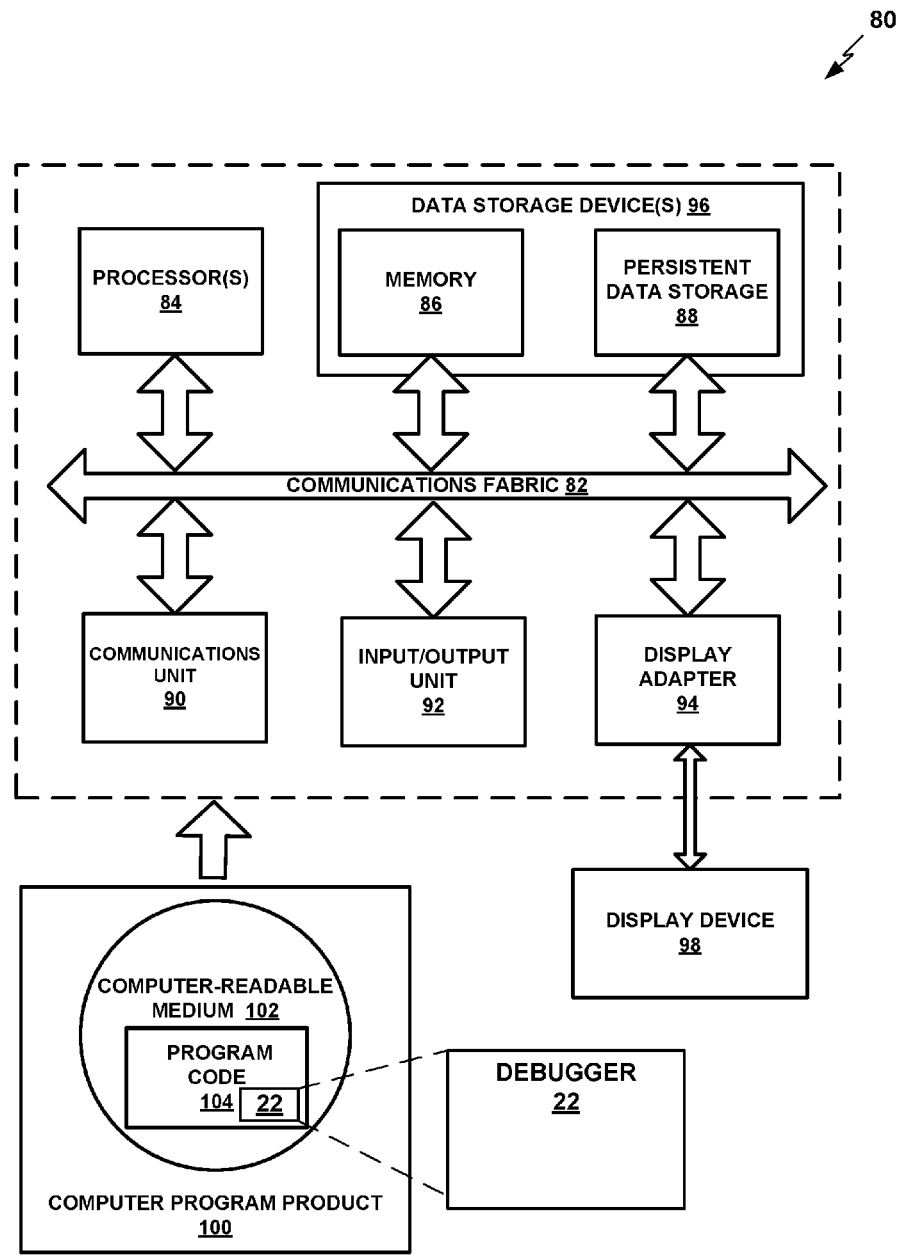
FIG. 9 depicts a block diagram of a computer program product that may be used to implement a debugger, in one aspect of this disclosure.

FIG. 9 is a block diagram of a computing device 80 that may be used to implement debugger 22, in one aspect of this disclosure. Computing device 80 may be a server such as one of web servers or application servers. Computing device 80 may also be any server for providing an enterprise business intelligence application in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a computing device 80 may include a computer having capabilities or formats other than or beyond those described herein.

In the illustrative example of FIG. 9, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage mediums. Persistent data storage 88 may store computer-executable instructions or computer-readable program code for an operating system, application files including program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, computer-readable data storage devices. Data storage 96 may include any of various forms of volatile memory that may require being periodically electrically refreshed to maintain data in memory, while those skilled in the art will recognize that this also constitutes an example of a physical computer-readable data storage device. Executable instructions may be stored on a medium when program code is loaded, stored, relayed, buffered, or cached on a physical medium or device, including if only for only a short duration or only in a volatile memory format.

Processor unit 84 can also be suitably programmed to read, load, and execute computer-executable instructions or computer-readable program code for a debugger 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below. In other embodiments, program code 104 need not include all of the program code for debugger 22, but includes at least program code of pattern identifying unit 24 and pattern operation unit 26

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which includes a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 including computer-executable instructions may be communicated or transferred to computing device 80 from computer-readable medium 102 through a hard-line or wireless communications link to communications unit 90 and/or through a connection to input/output unit 92. Computer-readable medium 102 including program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible mediums, such as communications links or wireless transmissions containing the program code 104. Program code 104 may be more or less temporarily or durably stored on any number of intermediate, physical computer-readable devices and mediums, such as any number of physical buffers, caches, main memory, or data storage components of servers, gateways, network nodes, mobility management entities, or other network assets, en route from its original source medium to computing device 80.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
identifying, with one or more processing devices, a pattern of two or more stop events in a program code; and
executing, with the one or more processing devices, the program code in a debugger, wherein executing the program code comprises:
encountering a first stop event in the program code;
determining if the first stop event is part of the identified pattern of stop events;
encountering a second stop event in the program code;
determining if the second stop event is part of the identified pattern of stop events;
ignoring the first stop event in response to determining that the first and second stop events are part of the identified pattern of stop events; and
stopping the execution of the program code in response to determining that the second stop event is not part of the identified pattern of stop events.

2. The method of claim 1, wherein identifying the pattern of two or more stop events in the program code comprises entering a sequence of one or more stop events associated with the program code.

3. The method of claim 2, wherein identifying the pattern of two or more stop events in the program code further comprises entering one or more conditional statements for determining when theسequence of stop events is part of the pattern.

4. The method of claim 3, wherein the one or more conditional statements comprises at least one of an additional stop event, a multiple occurrence criterion, an exclusion criterion, or a loop function.

5. A computer system comprising:
one or more processors and one or more computer-readable memories;
program instructions, stored on at least one of the one or more storage mediums for execution by at least one of the one or more processors via at least one of the one or more memories, to identify a pattern of two or more stop events in a program code;
program instructions, stored on at least one of the one or more storage mediums for execution by at least one of the one or more processors via at least one of the one or more memories, to encounter a first stop event in the program code;
program instructions, stored on at least one of the one or more storage mediums for execution by at least one of the one or more processors via at least one of the one or more memories, to determine if the first stop event is part of the identified pattern of stop events;
program instructions, stored on at least one of the one or more storage mediums for execution by at least one of the one or more processors via at least one of the one or more memories, to encounter a second stop event in the program code;
program instructions to determine, in response to encountering a second stop event in the program code, if the second stop event is part of the identified pattern of stop events;
program instructions, stored on at least one of the one or more storage mediums for execution by at least one of the one or more processors via at least one of the one or more memories, to ignore the first and second stop event in response to determining that the first and second stop events are part of the identified pattern of stop events; and
program instructions to stop execution in response to determining that the second stop event is not part of the identified pattern of stop events.

6. The computer system of claim 5, wherein the program instructions to identify the pattern of two or more stop events in the program code comprise program instructions to enter a sequence of one or more stop events associated with the program.

7. The computer system of claim 6, wherein the program instructions to identify the pattern of two or more stop events in the program code comprise program instructions to enter one or more conditional statements for determining when a sequence of stop events is part of the pattern.

8. The computer system of claim 7, wherein the one or more conditional statements comprises at least one of an additional stop event, a multiple occurrence criterion, an exclusion criterion, or a loop function.

9. A computer program product comprising a non-transitory computer-readable storage medium having program code embodied therewith, the program code executable by a processor to:
identify a pattern of two or more stop events in a program code;
encounter a first stop event in the program code;
determine if the first stop event is part of the identified pattern of stop events;
encounter a second stop event in the program code;
determine if the second stop event is part of the identified pattern of stop events;
ignore the first stop event and the second stop event in response to determining that the first and second stop events are part of the identified pattern of stop events; and
stop execution in response to determining that the stop event is not part of the identified pattern of stop events.

* * * * *